June 22, 1954   R. E. RENARD   2,681,968
MACHINE FOR WELDING CAN OPENING KEYS ON CAN ENDS
Filed April 29, 1952   4 Sheets-Sheet 1

INVENTOR.
ROLAND E. RENARD
BY Julian Caplan
ATTORNEY.

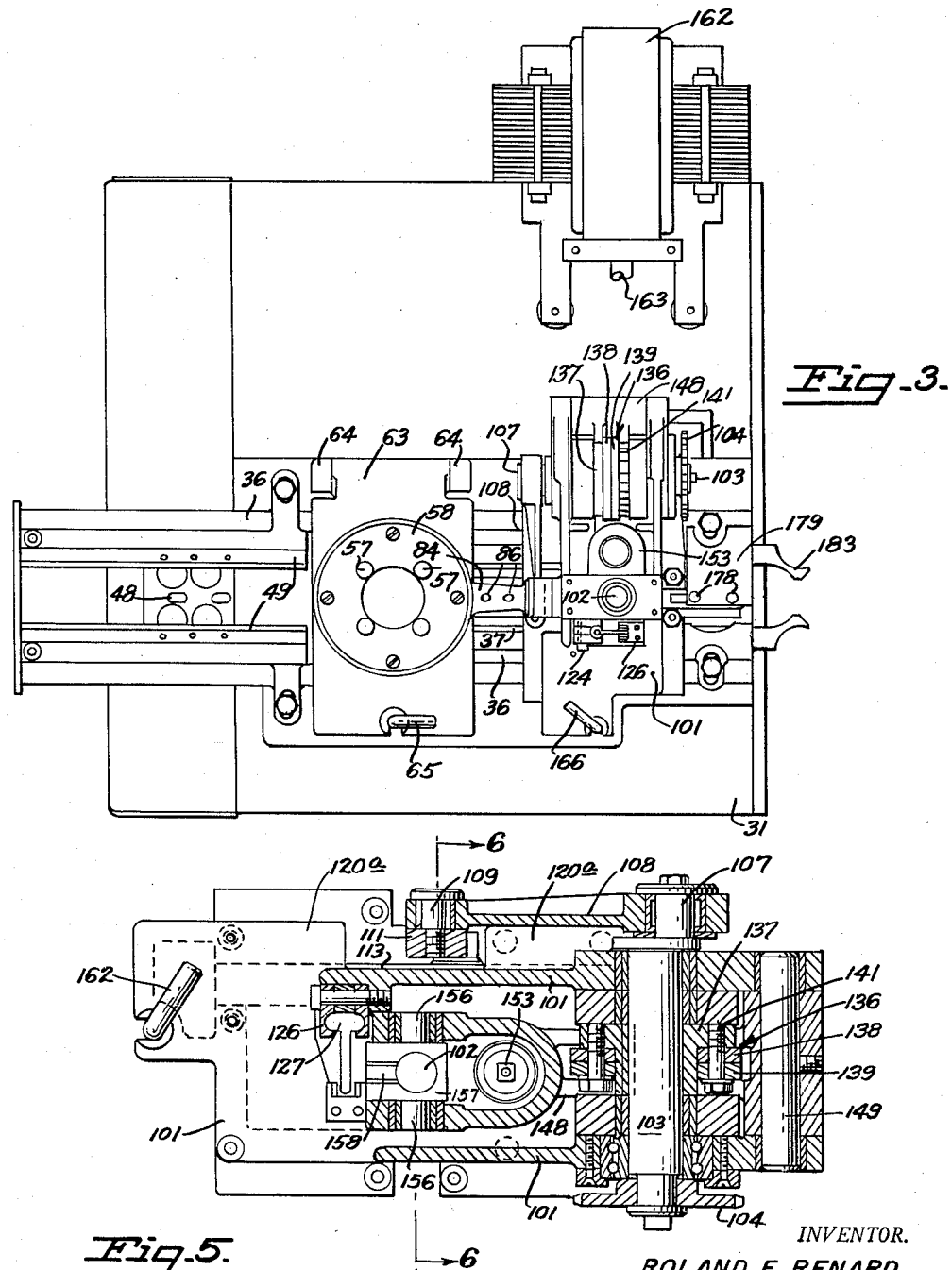

June 22, 1954   R. E. RENARD   2,681,968
MACHINE FOR WELDING CAN OPENING KEYS ON CAN ENDS
Filed April 29, 1952   4 Sheets-Sheet 3
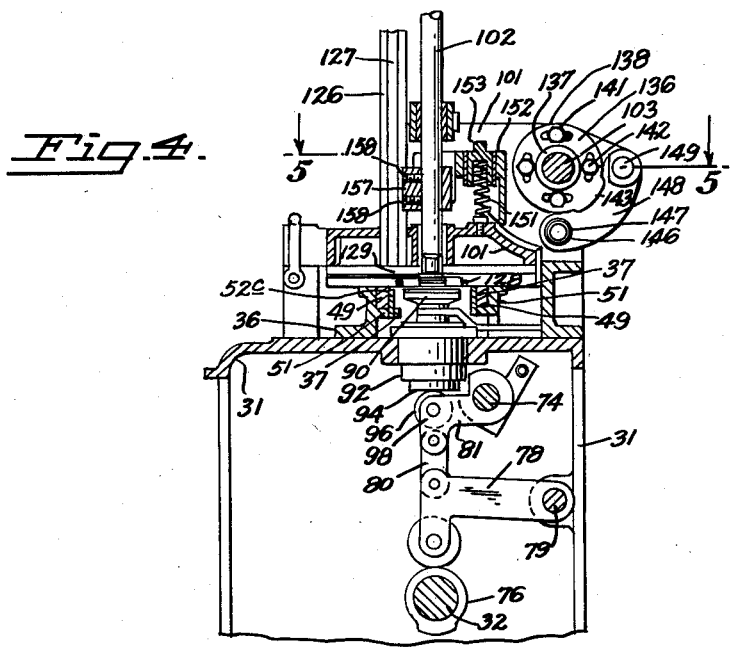
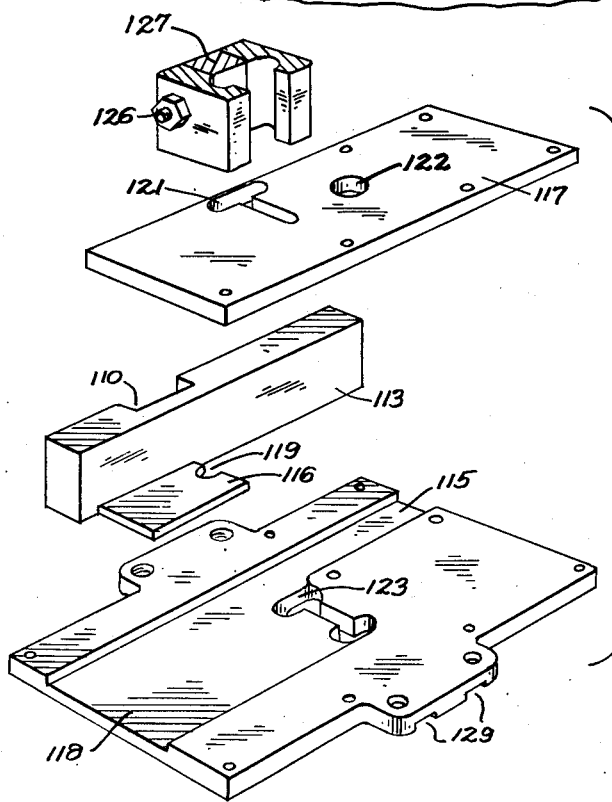
INVENTOR.
ROLAND E. RENARD
BY Julian Caplan
ATTORNEY June 22, 1954     R. E. RENARD     2,681,968
MACHINE FOR WELDING CAN OPENING KEYS ON CAN ENDS
Filed April 29, 1952     4 Sheets-Sheet 4
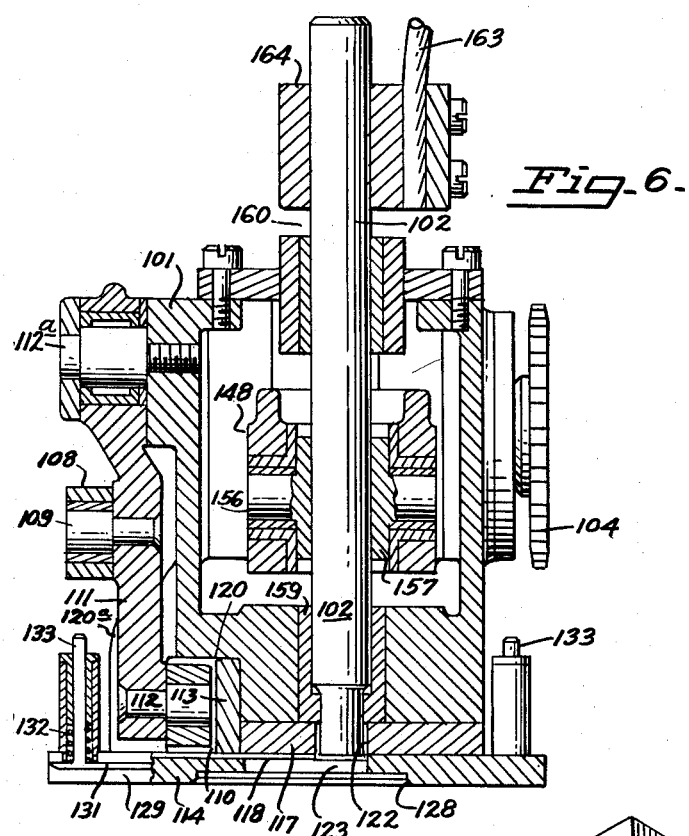
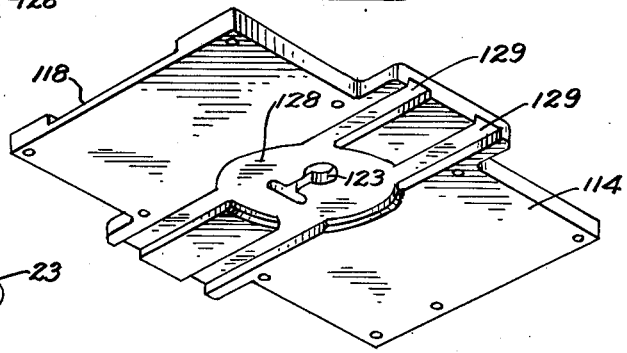
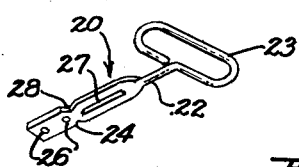
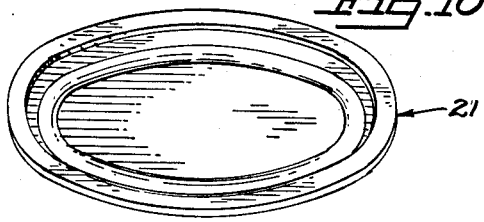
INVENTOR.
ROLAND E. RENARD
BY Julian Caplan
ATTORNEY Patented June 22, 1954

2,681,968

UNITED STATES PATENT OFFICE 2,681,968

MACHINE FOR WELDING CAN OPENING KEYS ON CAN ENDS

Roland E. Renard, Los Gatos, Calif., assignor to Pacific Can Company, San Francisco, Calif., a corporation of Nevada Application April 29, 1952, Serial No. 284,890

7 Claims. (Cl. 219—4)

This invention relates to new and useful improvements in machines for welding can-opening keys to can covers.

It is common practice to weld a key to the cover of a can, prior to assembly of the cover on the can body, so that the key may be used by the consumer to wind a tear strip from the upper end of the can body, thus affording access to the can. Such keys are of various shapes, but generally are formed of wire with one end of the wire bent into an oblong handle and the opposite end of the wire flattened, the flattened tail being formed with a slot for the reception of the end of the tear strip of the can. The end of the tail is spot-welded to the cover adjacent its extremity. The tail is weakened between the slot and the point of welding so that the key may readily be removed from the can by lifting the handle and fracturing the tail at the weakened point.

The present invention relates to a machine which feeds covers and keys in timed relation so that the two components come together under an electrode which descends in timed relation to the movement of the cover and key to spot-weld the elements together. The covers are fed from the bottom of a stack onto a feed table and thence are moved to an idle station and are then moved to the welding station. After key and cover are welded at the welding station, the elements are moved to a second idle station and then are moved to a discharge station. The idle stations are provided so that the stroke of the reciprocating member which feeds the ends from station to station may be reduced to half that which would otherwise be required. Further, the idle stations provide convenient locations for visual inspection of the can ends before and after the keys are attached.

While the can ends are proceeding to the welding station, the keys are removed from the bottom of a stack of keys and moved transverse to the path of travel of the can ends to the welding station where they are assembled onto the end in proper position.

Other objects of the present invention will become apparent upon reading the following specification and referring to the accompanying drawings in which similar characters of reference represent corresponding parts in each of the several views.

Fig. 3 is a top plan.

Fig. 4 is a vertical section taken substantially along the line 4—4 of Fig. 1.

Fig. 5 is a section taken substantially along the line 5—5 of Fig. 4.

Fig. 6 is a vertical section taken substantially along the line 6—6 of Fig. 5.

Fig. 7 is a schematic, exploded perspective view of some of the elements of the key feed mechanism.

Fig. 8 is a perspective view of the lower guide plate of the key feed sub-assembly.

Fig. 9 is a perspective of a key such as may be used with the invention.

Fig. 10 is a perspective of a can end on which such a key may be welded by means of the machine hereinafter described.

Figure 1:
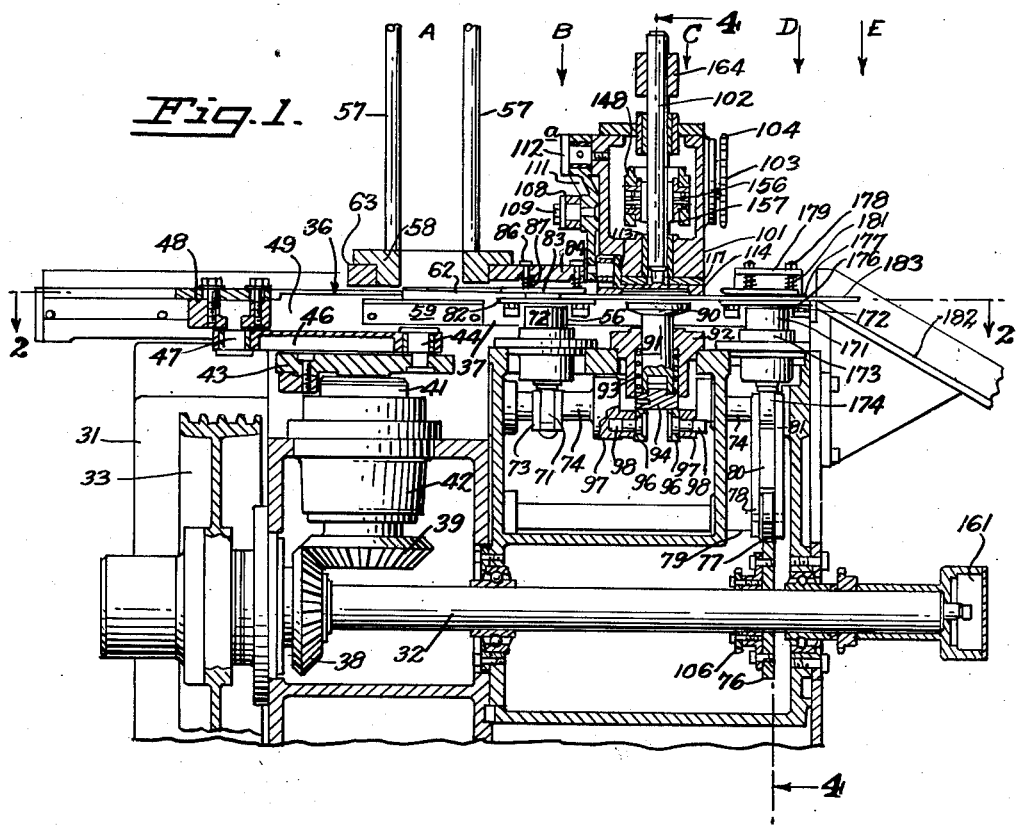
Fig. 1 is a longitudinal, vertical midsection of the machine showing the feed mechanism in forward position.

The present invention comprises a machine for assembling keys 20 on can covers 21 and welding the two components together. The keys 20 used in conjunction with this machine may be of any conventional shape, preferably formed of round wire. At one end of the elongated shank portion 22 of the key the wire is bent to form an oblong handle 23. The opposite or tail end 24 of the shank is flattened, with welding protuberances 26 on the underside of the flattened tail which localize the passage of the spot welding current and penetrate through any dielectric material on the can end when pressure is applied to press the key against the end. The shank is apertured in an elongated slot 27 which receives the free end of a conventional tear strip for a key-opening can, and intermediate the slot 27 and the welding protuberances 26 the shank is nicked as indicated by numeral 28 to weaken the shank so that the key may be fractured at this position when the consumer lifts the handle of the key to remove the key from the can end.

The can ends 21 employed are of conventional circular shape with downwardly curled flanges filled with compound for hermetically sealing the can end to the can body when a double seaming operation is performed in a can closing machine, as is well understood in the can making art. One or more surfaces of the can end may be coated with dielectric material, such as enamel for preservation of the can end against rusting, but for the purpose of this application it will be assumed that either the can end is bare metal or that the coating is applied only to the top surface and it is penetrated by the welding protuberances during the application of pressure in the welding step. In this connection, reference is made to my co-pending application Serial No. 196,571, filed November 20, 1950, now Patent No. 2,618,725, dated November 18, 1952, for the construction and mounting of the welding electrodes where dielectric coatings are applied to both top and bottom surfaces of the can ends.

The machine which comprises this invention is provided with a suitable frame 31 which supports the moving parts. Suitably journalled in the frame is a main drive shaft 32, horizontally longitudinally disposed, said shaft being keyed to a drive pulley 33 at one end, said pulley being arranged to be belt driven from a motor (not shown). Bolted to the top of frame 31 is a longitudinally extending feed table 36 and recessed below said table is a pair of stationary horizontal can end supports 37, along which the can ends are arranged to slide from station to station as they progress through the machine. Spaced equal distances apart in a straight line along said feed table are, in order, a feed station A, a first idle station B, a welding station C, a second idle station D, and a discharge station E. The feeding of the ends from station to station will first be described.

Cover feed mechanism

On one end of the main drive shaft 32 is a bevel gear 38 which meshes with another bevel gear 39 on the lower end of vertical shaft 41, said vertical shaft being suitably journalled in housing 42 fixed to frame 31. On the upper end of vertical shaft 41 is mounted crank cheek 43 which revolves in a horizontal plane in synchronism with main drive shaft 32. Crank pin 44 is rotatably held on crank cheek 43, and said pin is received in horizontally disposed connecting rod 46. The opposite end of connecting rod 46 is provided with a second pin 47, which is in turn revolvably held in crosshead 48. On each side of the machine, at the level of the feed table 36, is a feed bar 49, slidably held in ways 51 in table 36 and retained by supports 37 for horizontal longitudinal reciprocating motion. One end of each feed bar 49 is bolted to crosshead 48. Fixed spaced apart on each feed bar 49 a distance equal to the distance between stations of the machine is a plurality of feed fingers 52, each set of feed fingers being horizontally opposed. Said fingers slide over supports 37. From the foregoing description of the feed mechanism it will appear that the feed bars 49 and fingers 52 reciprocate horizontally longitudinally of the machine in timed relation to the rotation of the main drive shaft 32. As will hereinafter appear, at each of the stations of the machine the can ends are elevated above the level of the feed table by means of vertically reciprocating chucks, the movement of said chucks being in timed relation to the reciprocation of the feed bars 49 so that when the feed bars move backward the can ends are elevated above feed table 36 and out of contact with the feed fingers 52. Thus, as the feed bars 49 move forwardly the first pair of feed fingers 52a moves a can end from the feed station along to the first idle station B where, as hereinafter is set forth in greater detail, a chuck 56 elevates the can end above the level of the feed fingers 52b while the feed bars 49 retract. From the first idle station B a second set of feed fingers 52b moves the can end to the welding station C. A third set of fingers 52c moves the can ends from the welding station C to the second idle station D, and a fourth set of fingers 52d moves the ends to the discharge station E.

Feed station

The feed station A is located at one end of the path of the ends through the machine. At this station a vertical stack of ends is positioned above the feed table 36, being held in vertical alignment by a plurality of vertical rods 57 which are tangent to the periphery of the ends. A collar 58 having an internal bore equal to the outside diameter of the ends is placed at the bottom of the stack. Said collar 58 is bolted to and extends through an aperture in member 63 which is pivotally mounted on top of frame 31 by means of ears 64 on one side of the frame and latch 65 on the opposite side. When a jam occurs, latch 65 is opened and member 63 is swung up to afford access to the mechanism below. Below the bottom edge of said collar 58 and above the feed table 36 is a gap slightly longer than the thickness of a can end. A stationary cross member 59 extends across table 36 below collar 58 and functions to prevent more than one end being fed at a time and insures that the ends are fed horizontally. A pair of opposed blades 61 is fixed to feed bars 49, said blades operating on the return stroke of said feed bars to cut between the lowermost end in collar 58 and drop the lowermost end onto inclined guides 62. On the forward stroke of feed bars 49, fingers 52a push the can end along inclined guides 62 until the can end rests upon supports 37.

It will be understood that the foregoing description of the feed station is simplified inasmuch as the details of construction thereof constitute no part of this invention, and there are many different types of feed mechanisms to feed one can end at a time from the bottom of a vertical stack of ends onto a horizontal conveyor.

First idle station

Fingers 52a advances the can end from feed station A to the first idle station B. At the first idle station B there is a vertically reciprocating chuck 56 onto which the can end slides. Said chuck 56 is mounted on the top of vertical shaft 71 which is received in bearings 72 mounted on frame 31. The lower end of shaft 71 is received between bifurcated arm 73, said arm being mounted on horizontal, longitudinally disposed secondary shaft 74. Secondary shaft 74 is journalled in frame 31 and oscillates in timed relation to rotation of main shaft 32. Oscillation of secondary shaft 74 may be accomplished in several ways, one way illustrated herein involving mounting of a cam 76 on main drive shaft 32, with a roller 77 riding on the top of said cam. Roller 77 is mounted on bifurcated rocker arm 78, said arm being pivotally mounted to frame 31 by stud 79. A link 80 connects arm 78 with bifurcated arm 81 on shaft 74, there being pin connections at each end of said link 80. Thus as main shaft 32 revolves, secondary shaft 74 oscillates and the shape of cam 76 is made such that secondary shaft 74 is at the low point of its stroke while feed bars 49 are moving forwardly and at the high point of its stroke when said feed bars are retracting.

Thus chuck 56 moves upward after feed fingers 52a deposit a can end thereupon until the end is lifted above the level of the feed table 36, and when the end is so lifted the feed bars 49 retract. In this manner the returning feed fingers 52b do not operate to move the feed fingers back to the preceding station. In order to prevent dislodgement of the can end from chuck 56, said chuck is provided with a pair of horizontal, longitudinally extending shoes 82 which engage the underside of the end. At the idle station is a pair of horizontal, longitudinally extending shoes 83. Shoes 83 are supported from stationary member 84, which is a longitudinal extension of member 63, fixed to frame 31 by means of vertical pins 86 biased downward by springs 87. Shoes 82 and 83 are held a fixed distance apart so that an end may slide therebetween and be held against dislodgement. When chuck 56 is elevated, shoe 83 moves up, compressing springs 87 to prevent crushing the end.

Welding station

From the first idle station B, the can end is moved forward by the second set of feed fingers 52b to the welding station C. At the welding station C there is provided a chuck 90 having a shaft 91 mounted for vertical reciprocation in a guide 92 attached to main frame 31. The lower part of said guide 92 is counterbored to provide a cavity to receive a coil spring 93 which surrounds shaft 91, the lower end of said shaft 91 having an extension 94 against which said spring 93 bears, the effect being that spring 93 biases chuck 99 downward. Extension 94 rides on diametrically opposed rollers 96 which are rotatably mounted in the opposite arms of yoke 97 by pins 98, said yoke being fixed at its opposite end on secondary shaft 74 for rocking motion in timed relation with rotation of main drive shaft 32. The period and amplitude of motion of chuck 90 is such that the chuck 90 is below the level of the feed table 36 as feed fingers 52c move the end forwardly so that the end slides onto said chuck 90, and thereafter chuck 90 is elevated above the level of the feed table 36 while feed fingers 52c are indexing backward to retracted position.

At welding station C is a subassembly having a base 101 which is mounted on main frame 31. Said welding station C includes means for moving the keys 20 at right angles to the direction of movement of the ends 21 so that a key 20 is deposited on each end 21 and also a welding electrode 102 which is arranged to move downward and exert pressure to force the key 20 against the end 21 while a welding current passes through the parts to weld the end and key together. The mechanism for moving the key 20 and electrode 102 is driven off a third shaft 103, journalled in base 101, one end of shaft 103 carrying sprocket 104 attached by a chain (not shown) to sprocket 106 on main drive shaft 32.

The end of shaft 103 opposite sprocket 104 bears crank pin 107 which is received in one end of transversely extending connecting rod 108. The opposite end of connecting rod 108 bears pin 109 which is, in turn, received by second connecting rod 111 at a point intermediate the ends thereof. The upper end of second connecting rod 111 is pivotally attached by means of pin 112a to frame member 101 and the lower end of second connecting rod 111 bears roller 112 which fits in vertical slot 110 in slide bar 113. The effect of this linkage arrangement is to magnify the amplitude of the horizontal transverse stroke of slide bar 113 as shaft 103 revolves.

Slide bar 113 slides horizontally transversely of the machine within a groove 115 in the upper surface of lower guide 114, and a groove 120 in the lower part of base 101, there being extensions 120a on base 101 retaining bar 113 against lateral displacement. Key mover 116 is bolted to the underside of slide bar 113 for movement therewith, said key mover 116 sliding between the lower face of upper guide plate 117 and lower guide 114, which has a groove 118 in its upper face, the thickness of key mover 116 and the depth of groove 118 being slightly greater than the thickness of a key 20. The leading edge of key mover 116 is recessed as indicated by reference numeral 119 in a shape corresponding generally to that of half of handle 23 of key 20. Thus, when, as hereinafter appears, a key 20 is deposited in the groove 118 between upper guide 117 and lower guide 114, the key nests in the recess 119 of key mover 116 and is slid forwardly by said key mover, the stroke being controlled by linkage heretofore described from crank 107. Upper guide 117 is apertured in two positions. One aperture 121 is in the general outline of a key and the other aperture 122 is round and of a diameter slightly larger than that of welding electrode 102. The distance between aperture 121 and 122 is equal to the amplitude of reciprocation of key mover 116. Lower stationary guide 114 over which key mover 116 slides in groove 118, is apertured immediately under welding electrode 102, the shape of this aperture 123 being a composite of the general outline of key 20 with a circle superimposed, said circle being slightly larger than the diameter of electrode 102. Fixed above the feed table 36 is a vertical guideway 126 for keys, said guideway 126 being routed out as indicated by numeral 127 in the general shape of a key so as to hold a stack of keys with their shanks horizontal in a vertical stack. Guideway 126 is preferably made of three separate pieces bolted together by bolts 124 for ease in manufacture. Guideway 126 is fixed to frame member 101 spaced outwardly of the center of the path of travel of ends. Key mover 116 slides immediately under upper guide aperture 121 which coincides with the bottom of key guideway aperture 127. Key mover 116 normally closes off aperture 127 to prevent discharge of any keys. When key mover 116 is in retracted position, however, recess 119 coincides with the bottom of guideway aperture 127, and since the thickness of key mover 116 is equal to that of a key 20, a single key 20 drops off the bottom of the stack of keys in guideway 124 and fits loosely in recess 119 between guides 114 and 117. The timing of sliding movement of key mover 116 is such that it is in retracted position when welding electrode 102 is descending with the result that one key 20 is dropping into recess 119 at the same time that the preceding key is being welded to the can end 21 by electrode 102 which is descending through apertures 122 and 123. After welding is completed and electrode 102 is elevated, key mover 116 moves forward sliding another key 20 with it until the key 20 drops into the aperture 123 in lower guideway 114. Lower guideway 114 is circularly recessed as indicated by numeral 128 in its undersurface to provide for reception of end 21, and the timing of the moving parts is such that an end 21 is moved up by chuck 90 into recess 128 when a key drops into aperture 123.

In order to hold end 21 on chuck 90 a pair of longitudinal grooves 129 are cut in the undersurface of lower guide 114 and within each groove shoe 131 is biased downwardly by means of springs 132 surrounding pins 133 carried by shoe 131, there being sufficient clearance below shoe 131 to permit an end 21 to be fed between it and chuck 90 when said chuck 90 is at the bottom of its stroke, and there being sufficient vertical movement allowed by the depth of groove 129 for shoe 131 to permit said shoe 131 to be raised against the pressure of springs 132 when chuck 90 raises end 21 above the level of feed table 36.

The descent of electrode 102 is controlled by cam 136 which is mounted on shaft 103. Said cam actually comprises a collar 137 keyed to shaft 103 and two cam plates 138 and 139, said plates being angularly shiftable relative to each other and collar 137 when bolts 141 which pass through arcuate slots 142 in cam plates 138 and 139 are loosened. Each cam plate 138 and 139 has a high dwell sector 143 and by shifting these sectors 143 so that they are more nearly consecutive or more nearly concurrent the timing of cam 136 may be lengthened or shortened, as required.

Cam 136 engages cam roller 146 which is rotatably mounted by means of a pair of ball bearings 147 between the arms of yoke member 148, said yoke member being pivotally mounted by means of shaft 149 to frame member 101 in which shaft 103 is journalled. Spring 151 is mounted to bear against an extension 152 of yoke 148 to bias yoke member 148 upwardly with respect to frame member 101, screw 153 being adjustable to vary the effective force of said spring 151. Yoke member 152 is pivotally mounted by means of diametrically opposed pins 156 to electrode holder 157, said holder having a bore receiving electrode 102, with set screws 158 being provided to adjust the position of electrode 102 within the holder 157. A guide 159 in the bottom of base 101 is bored for reception of the reduced diameter lower end of electrode 102 and another guide 160 at the top of base 101 confines electrode 102 to a vertical stroke in alignment with apertures 122 and 123.

The effect of this arrangement is that cam 136 controls the timing of the downward movement of electrode 102 and the duration of the welding period, while spring 151 returns electrode 102 to retracted position. Thus, the composite effect of crank 107, cam 136, the reciprocation of feed bars 48, and the oscillation of secondary shaft 74 which actuates chuck 90 is as follows: A can end 21 is moved from first idle station B to the welding station C at a time when chuck 90 is retracted, welding electrode 102 is elevated and key mover 116 is retracted, said end 21 being received and clamped between shoe 131 and chuck 90. Chuck 90 then elevates end 21 above the level of the feed table 36 and thereupon feed bars 49 retract, feed fingers 52c not interfering with end 21 because said end 21 is elevated. As chuck 90 elevates end 21, key mover 116 moves inward, sliding a single key 20 between guides 114 and 117 in groove 118, and said key drops into aperture 123 in lower guide 114 and comes to rest on end 21. Key mover 116 immediately and rapidly retracts until recess 119 is immediately under the bottom end of key guideway 126, whereupon another key falls through aperture 121. While key mover 116 is in retracted position cam 136 operates to depress electrode 102 through aperture 122 in guide 117 and aperture 123 in guide 114. Switch 161 mounted on the end of main drive shaft 32 is timed to operate to cause a welding current to pass from transformer 162 through electrode 102, there being a connection 163 from transformer 162 to terminal 164 on electrode 102 and another connection (not shown) from transformer 162 to chuck 90.

The pressure exerted by electrode 102 on key 20 is sufficient to cause the protuberances 26 on the bottom of the flattened tail 24 thereof to push through any dielectric material on the top of the end 21.

It will be understood that the whole welding sub-assembly may be lifted up for removing jammed ends or for inspection. This is accomplished by reason of the fact that frame member 101 is pivotally mounted around shaft 103 at one end and the free end of frame member 102 is held by latch 166 tight against frame 31.

Second idle station

From welding station C the can ends are moved by feed fingers 52c to second idle station D which is similar in construction and function to station B. At station D is provided a vertically reciprocating chuck 171 on the upper end of shaft 172 held in housing 173 on frame 31. Shaft 172 is moved vertically by means of roller 174 which bears against the bottom thereof, said roller being mounted in bifurcated arm 81 mounted on secondary shaft 74.

The top of chuck 171 bears longitudinally extending bottom shoe 176 on which the can end is slid by fingers 52c. Spaced above bottom shoe 176 is a pair of spaced longitudinally extending top shoes 177 depending by means of pins 178 from stationary member 179 attached to the top of frame 31. Springs 181 bias top shoes 177 downwardly, but a space equal to the thickness of a can end between top shoes 177 and bottom shoe 176 permits the can end to be fed therebetween. When chuck 171 is elevated, springs 181 compress allowing the end to be elevated above the level of feed table 36 so that feed fingers 52d do not strike the can end when said fingers 52d move back on the return stroke of feed bars 49.

Discharge station

From station D, feed fingers 52d feed the can ends to station E. Said station E comprises a downwardly inclined chute 182 onto which the ends fall through a circular cut out in extension 183 or slides 37.

Operation

Figure 2:
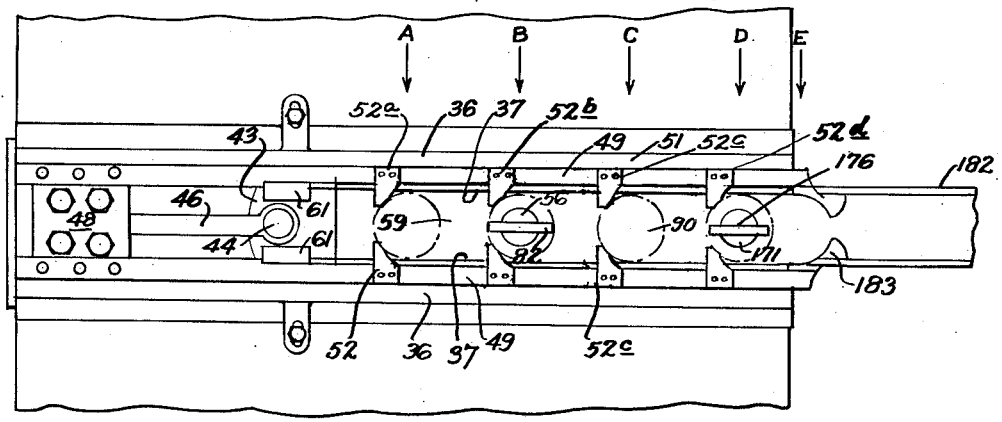
Fig. 2 is a fragmentary view taken substantially along the line 2—2 of Fig. 1 showing the feed mechanism in retracted position and having some parts omitted for purposes of clarity.

In operation, assuming the machine is at the start of the feed stroke, feed bars 49 carrying feed fingers 52 are fully retracted to the left as shown in Fig. 2. At said position, a single can end has already been severed from the stack of ends in the hopper by means of blades 61 and is on inclined guides 62. Chucks 56, 90 and 171, are depressed below the level of slides 37. Key mover 116 is retracted under guideway 126 and a single key has dropped into groove 118 and recess 119. Electrode 102 is elevated.

Upon the forward stroke of the feed bars 49, feed fingers 52a move one can end from feed station A by sliding the end away from inclined guides 62, along slides 37 to station B, the end fitting between shoes 82 and 83. Simultaneously, fingers 52b move an end from station B to station C, the end being caught between shoes 131 and chuck 90. Fingers 52c move an end from station C to station D, where the end is retained between shoes 176 and 177. Fingers 52d move an end from station D to station E, the end dropping through the cut-out in extension 183 and falling into chute 182.

At the end of the forward stroke of the feed bars, chucks 56, 90 and 171 are elevated by reason of oscillation of secondary shaft 74 and the returning feed fingers on the return stroke of bars 49 do not move any of the can ends, except that blades 61 sever the lowermost can end in the stack at station A. When chucks 56, 90 and 171 elevate, shoes 83, 131 and 177 are likewise elevated (compressing springs 87, 131 and 181) to permit the can end to be raised.

After a can end has come to rest on top of chuck 90 and has been elevated thereby into the recess 128 on the underside of plate 114, key mover 116 has moved the corresponding key along groove 118 to drop through aperture 123 and onto the can end. Thereupon electrode 102 descends and presses the key against the end, and a welding current is passed through the key and end from transformer 162 through operation of timer 161. The timing of the movement of key mover 116 and electrode 102 has heretofore been described.

After welding has been completed, chucks 56, 90 and 171 descend and lower the can ends onto slides 37, welding electrode 102 being elevated simultaneously and the machine is ready for the next cycle of operations.

It will thus be seen that the can ends are fed one at a time along the feed table 36 from a vertical stack of ends in the hopper and that as the end comes to the welding station a key is fed on top thereof from a vertical stack of keys laterally offset and an electrode is depressed to weld the key and end together. Since all of the moving parts are driven from a single drive shaft, proper timing of the parts is readily adjusted.

What is claimed is:

1. A key welding machine for welding can-opening keys on can ends, comprising, a frame, a drive shaft journalled in said frame, means for rotating said drive shaft, a pair of feed bars reciprocable together horizontally in a straight line longitudinally of said frame, a plurality of pairs of opposed feed fingers on said feed bars, said fingers being substantially equally spaced along said feed bars, means operable from said drive shaft for reciprocating said feed bars to move can ends in a straight line, a feed table, a feed stack, means operable from said drive shaft for feeding can ends one at a time from said stack to said table at the level of said fingers, a key stack laterally offset from the path of said can ends, a key mover reciprocable transversely to the direction of movement of said feed bars for moving one key at a time from said key stack to a position between said feed bars to locate said key on a can end, said key mover being horizontally reciprocable in a straight line and driven from said drive shaft and movable in timed relation to movement of said feed bars, a vertically reciprocable welding chuck driven from said drive shaft, a first electrode on said welding chuck, a second electrode reciprocable in a direction opposite to reciprocation of said welding chuck, and means for moving said welding chuck in timed relation to said drive shaft.

2. A machine as defined in claim 1 which further includes idler means between said feed stack and said welding chuck, said idler means comprising a second chuck for holding said ends and means operable from said drive shaft for raising said chuck above the level of said fingers during the return stroke of said feed bars.

3. Mechanism for welding keys to can ends, comprising, a chuck for holding a can end, a key stack laterally offset relative to said chuck, a key guide above said chuck having a slot of a depth substantially equal to the thickness of a key extending from said stack to above said chuck and having an aperture positioned and shaped to permit keys to fall from said slot onto a can end held on said chuck, a key mover reciprocable in said slot for moving a key therewithin, a key feed bar rigidly fixed to said key mover and linearly reciprocable therewith, a rotatable shaft, means driving said key feedbar from said shaft, an electrode, said guide being apertured for passage of said electrode therethrough, a cam on said rotatable shaft, means driven by said cam for reciprocating said electrode to weld a key onto an end held on said chuck, said last-mentioned means being operable to depress said electrode after said key mover has dropped a key on an end, and means for reciprocating said chuck arranged to elevate said chuck prior to deposit of a key on a can end held thereby.

4. Key welding mechanism for welding keys having shanks and oblong handles on can ends, comprising, a base, a chuck dimensioned to receive a can end, first means for reciproctaing said chuck, a shaft journalled in said base rotated in timed relation to reciprocation of said chuck, a key stack mounted on said base laterally offset with respect to said chuck, a key guide having a slot extending from below said key stack to above said chuck and apertured to permit a key to drop from said stack into said slot and also apertured to permit a key to drop from said slot onto a can end held by said chuck, a key mover reciprocable in said slot to deliver a key from below said key stack to above said chuck, said key mover having its leading edge routed out in the shape of half a key handle, the remainder of said leading edge being straight to conform to a key shank, a key feed bar transversely linearly reciprocable on said base and rigidly fixed to said key mover, a crank on said shaft, second means for reciprocating said key feed bar from said crank, a welding electrode vertically reciprocable through an aperture in said key guide, a cam on said shaft, and third means controlled by said cam for depressing said electrode, said key mover and said electrode being driven in timed relation from said shaft to deposit a key on a can end in advance of descent of said electrode.

5. Mechanism according to claim 4 which further comprises fourth means for reciprocating said chuck in timed relation to movement of said key mover and said electrode, said chuck being arranged to be elevated prior to deposit of a key on a can end held by said chuck.

6. Mechanism according to claim 5 which further comprises a hopper for can ends, means for feeding can ends from said hopper one at a time, longitudinally reciprocable can end feed bars for moving can ends in a straight line from said hopper to said chuck, and means for reciprocating said feed bars in timed relation to said chuck to deposit a can end on said chuck prior to elevation of said chuck.

7. A key welding machine for welding keys on can ends comprising, a hopper station, a welding station, and a discharge station, first means for moving can ends one at a time from station to station in a straight line longitudinally of the machine, a key stack, second means for moving one key at a time from said key stack to said welding station in a straight line transversely to the direction of movement of said can ends in timed relation to movement of said first means, a movable welding electrode, third means for moving said welding electrode to force a key against a can end and weld the two components, and means operatively connecting said first, second, and third means to move can ends while said electrode is retracted from welding position, to move keys to said welding station while a can end is being moved to said welding station and deposit said key on said can end as said can end moves into position under said electrode, and to move said electrode to welding position after a key has been deposited on a can end.

References Cited in the file of this patent

UNITED STATES PATENTS

| Number | Name | Date |
|---|---|---|
| 1,635,536 | Butler | July 12, 1927 |
| 1,863,850 | Holloway | June 21, 1932 |
| 2,063,927 | Holloway | Dec. 15, 1936 |